United States Patent [19]
Brown et al.

[11] Patent Number: 4,761,887
[45] Date of Patent: Aug. 9, 1988

[54] TEMPERATURE INSENSITIVE GAUGE

[75] Inventors: Bernard J. Brown, Ann Arbor; Kerry L. Ritter, Britton, both of Mich.

[73] Assignee: Control Gaging, Inc., Ann Arbor, Mich.

[21] Appl. No.: 902,232

[22] Filed: Aug. 29, 1986

[51] Int. Cl.$^4$ .................................................. G01B 7/12
[52] U.S. Cl. ................................................... 33/148 H
[58] Field of Search ...................... 33/148, 125 T, 143, 33/147

[56] References Cited

U.S. PATENT DOCUMENTS

| | | | |
|---|---|---|---|
| 2,365,592 | 12/1944 | Reason | 33/147 N |
| 3,781,997 | 1/1974 | Pagella | 33/147 E |
| 4,238,886 | 12/1980 | Brown | 33/143 L X |
| 4,607,435 | 8/1986 | Boisen | 33/125 T X |

FOREIGN PATENT DOCUMENTS 260182 12/1969 U.S.S.R. ............................ 33/125 T

Primary Examiner—Harry N. Haroian
Attorney, Agent, or Firm—Harness, Dickey & Pierce

[57] ABSTRACT

A temperature insensitive gauge is disclosed. The temperature insensitive gauge includes a frame having a first and second caliper assembly movably mounted on the frame. The first and second caliper assemblies engage a workpiece. A mechanism for measuring the relative movement between the caliper assemblies is associated with the assemblies. The measuring mechanism provides measurement information on the size of the workpiece. A compensating mechanism is associated with the caliper assemblies for reducing thermally induced dimensional changes in the gauge.

11 Claims, 4 Drawing Sheets

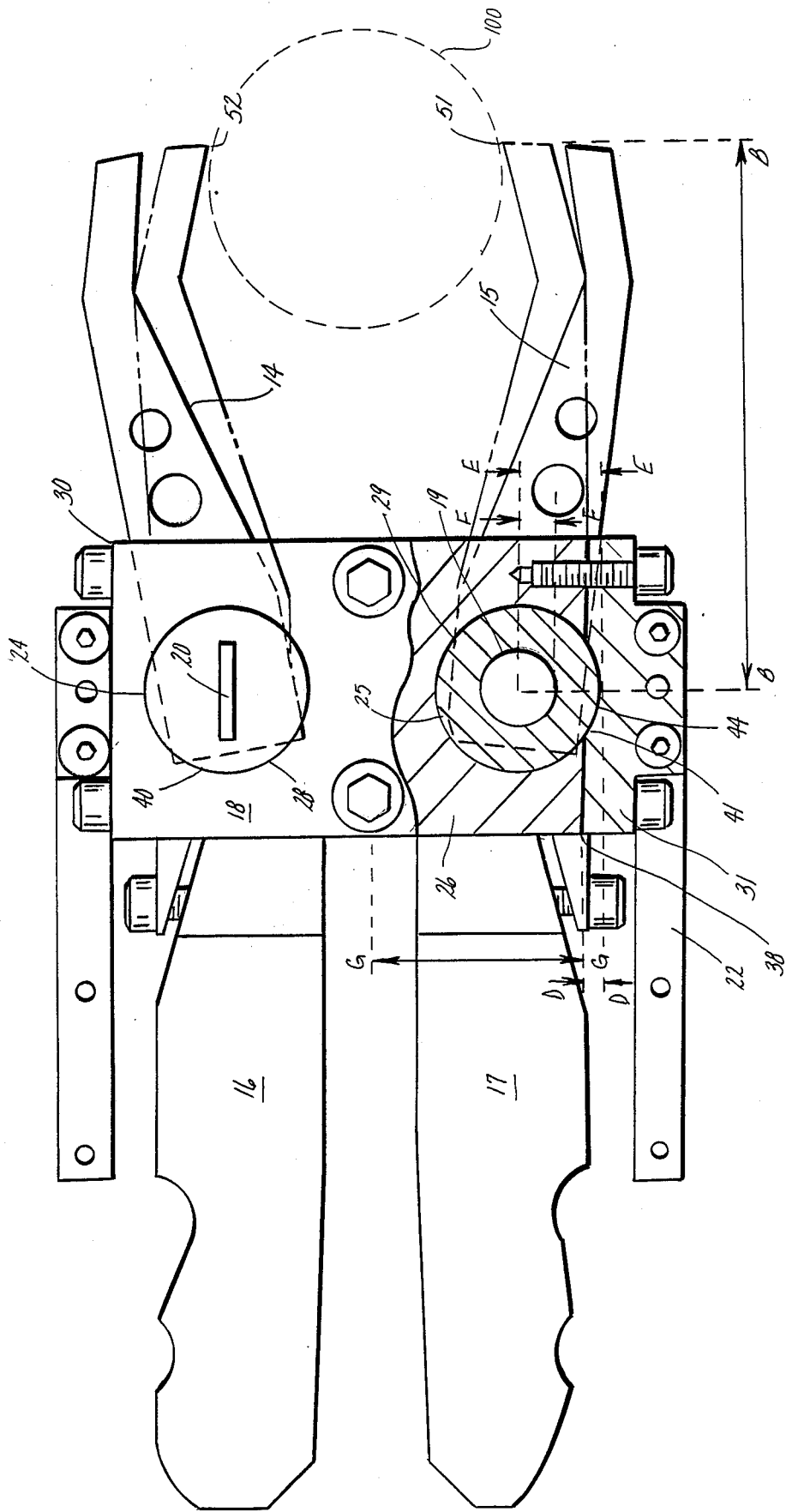

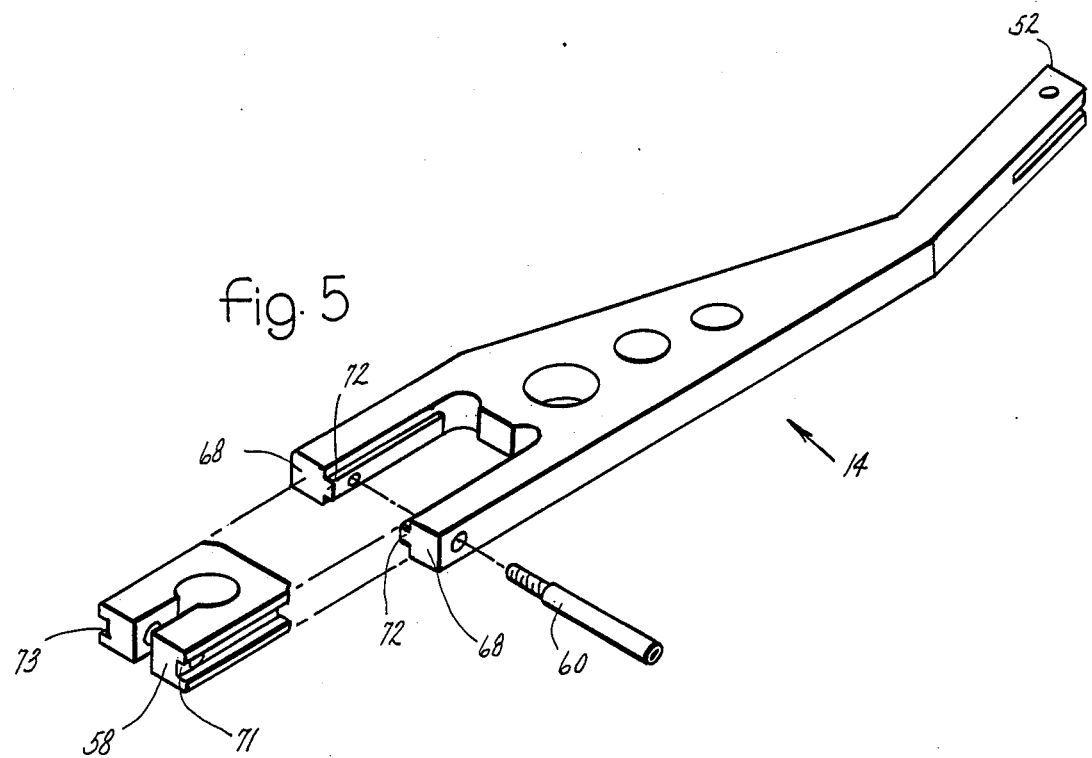
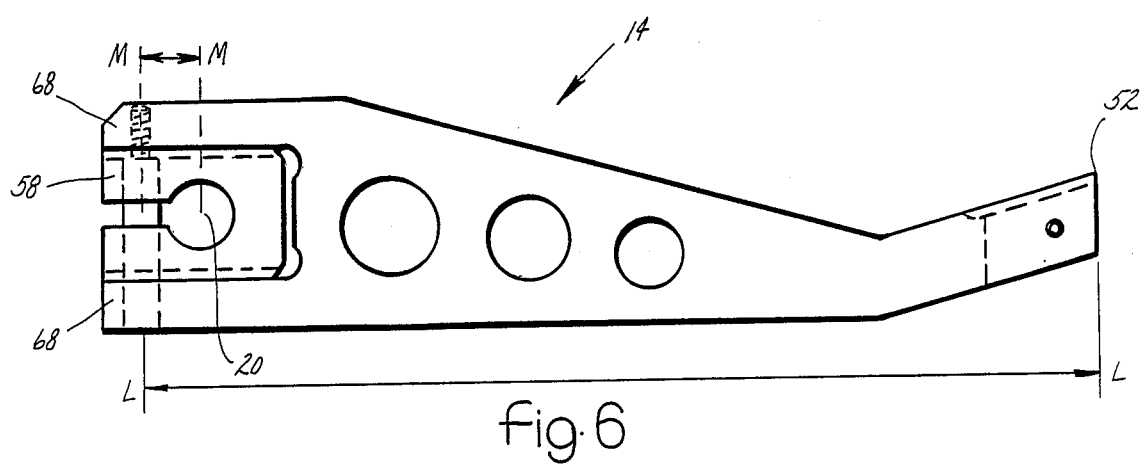

TEMPERATURE INSENSITIVE GAUGE

BACKGROUND OF THE INVENTION

The present invention relates generally to gauges, and more particularly, to an apparatus for controlling expansion and contraction occuring in critical components of a gauge during changes of the gauge's temperature.

Production machining or grinding of workpieces involves constant measurement of the workpiece by a gauge whose output often controls the operation of the machining tools. An example of such a gauge is found in U.S. Pat. No. 4,238,886, issued to Brown on Dec. 16, 1980. The gauge is in constant contact with the workpiece so that when the workpiece reaches certain dimensions, the gauge signals the machining tool instructing the tool to adjust its operation such as increasing or decreasing the cutting rate of a workpiece. When proper dimensions of the workpiece are reached, the gauge signals the machining tool to withdraw the cutting tools from the workpiece. Overall quality of the finished product, accurate dimensions, and proper finish require extremely precise gauging.

Changes in the ambient temperature of the gauge's environment affect the temperature of the gauge. Constant contact of the gauge with the workpiece while it is being machined provides a path through which heat is transferred to the gauge. The contact of the cutting tools with the workpiece and the friction that is present between the workpiece and the gauge results in the substantial buildup of heat which, in turn, results in a temperature rise in the gauge.

As the components of the gauge are heated they undergo thermal expansion. This thermal expansion changes the dimensions of the gauge. Expansion of critical components which can result in false readings of changes in the size of the workpiece. As the gauge is in a production run of workpieces, the measured size of the workpiece will vary based on the temperature of the gauge. While a gauge can be calibrated to be accurate at a certain temperature, calibration does not work successfully when the gauge is used throughout a range of temperatures. The present art suffers from having gauges whose accuracy is affected by changes of temperature. Thus, there is a need in the field for a gauge insensitive to dynamic temperature changes.

SUMMARY OF THE INVENTION

The present invention provides the art with a mechanism that substantially reduces thermally induced dimensional changes in sub-assemblies of the gauge which changes would otherwise affect the accuracy of the gauge. The present invention provides the art with a gauge whose reading is minimally affected by changes in temperature. Gauge sub-assemblies that would otherwise affect accuracy when undergoing thermal expansion are constructed from components of different metallic materials selected so that thermal expansion of one component is offset by thermal expansion of another component so that critical dimensions within the gauge are kept constant. The metallic components within the sub-assemblies are selected so that components that undergo thermal expansion in one direction, which would induce a false reading in the gauge, are offset by components that undergo thermal expansion in the opposite direction. The directional movement of the components is substantially equal thus, reducing the error created by thermally induced expansion. This matching of components is done by calculating the rate of thermal expansion in a first component or group of components expanding in a first direction, then coupling the first components with a second component or group of components that expand at an equal rate in the opposite direction.

From the following description and claims taken in conjunction with the accompanying drawings, other objects and advantages of the present invention will become apparent to one skilled in the art.

BRIEF DESCRIPTION OF THE DRAWINGS

FIG. 2 is a sectional view of the gauge showing part of the caliper assemblies.

FIG. 5 is a perspective view of an alternative embodiment of a gauge finger assembly.

FIG. 6 is a view of an alternative embodiment of a gauge finger assembly.

DETAILED DESCRIPTION OF THE PREFERRED EMBODIMENT

Figure 1:
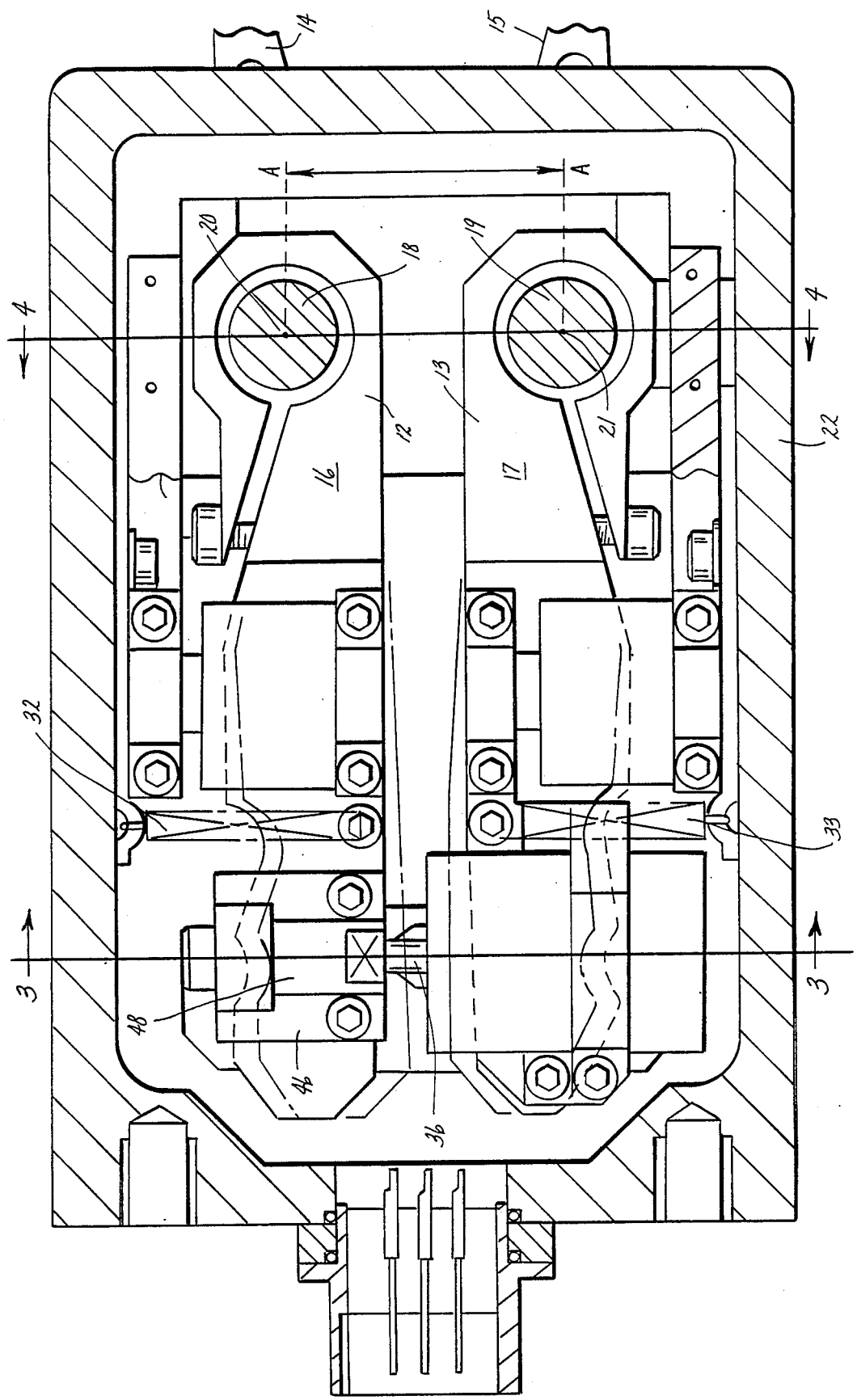
FIG. 1 is a sectional view of the body of a gauge with the arms for contacting the workpiece cut away.

In FIG. 1, the gauge, designated with a reference numeral 10, includes two caliper assemblies 12 and 13. The caliper assemblies include gauge fingers 14 and 15, arms 16 and 17, and the pivots 18 and 19, having longitudinal pivot axes 20 and 21. The pivots 18 and 19 connect arms 16 and 17, to gauge fingers 14 and 15, respectively, providing concommittant movement of the gauge fingers 14 and 15, with the arms 16 and 17, respectively. The pivots 18 and 19 are rotatably supported in a frame 22. Springs 32 and 33 are connected to arms 16 and 17 for biasing the arms 16 and 17 outward which, in turn, biases the gauge fingers 14 and 15 inwardly towards a workpiece 100 (shown in phantom in FIG.2). The bias force of springs 32 and 33 maintain gauge fingers 14 and 15 in contact with the workpiece. As the workpiece is machined to smaller dimensions, the gauge fingers 14 and 15 move inwardly towards one another. The pivoting of gauge fingers 14 and 15 toward one another about axes 20 and 21 cause arms 16 and 17 to pivot away from one another.

Turning to FIG. 2, the pivots 18 and 19 are supported within the frame 22 by bearings 24 and 25. The bearings 24 and 25 nest within a bearing cradle 26 which has two edges 28 and 29 creating dished out areas defining the overbored bearing chambers 40 and 41 into which the bearings 24 and 25 seat. End caps 30 and 31 are secured to the bearing cradle 26 for further defining the periphery of the overbored bearing chambers 40 and 41. The end caps 30 and 31 complete the periphery of the overbored bearing chambers 40 and 41.

Figure 3:
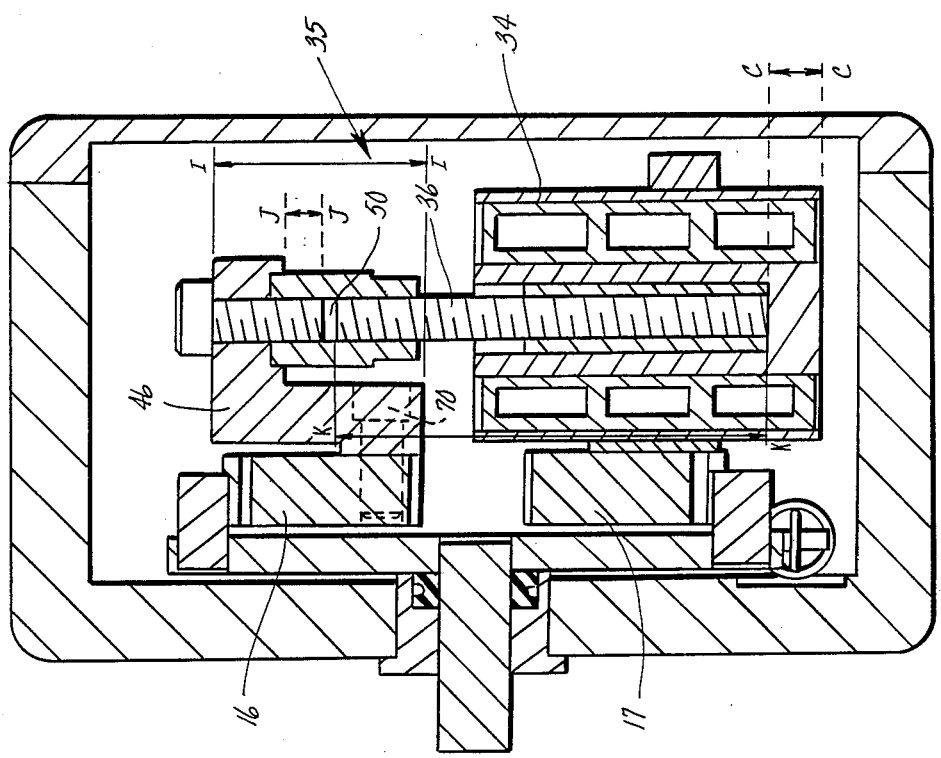
FIG. 3 is a sectional view of the gauge taken substantially from line 3—3 of FIG. 1.

Measuring mechanism 35 includes linear voltage distance transformer coil 34 secured to arm 17 and movable core 36 secured to the arm 16, as shown in FIG. 3. The linear voltage transformer 34 produces a voltage. The magnitude of the voltage, which is variable, is produced in response to the position of the core 36 relative to the body of the transformer coil 34. At start up of the tool, with the arms 14 and 15 engaging the workpiece 100 (shown in phantom in FIG. 2), gauge 10 has a reference voltage at the transformer coil 34. As material is removed from the workpiece 100, the arms 16 and 17 are moved away from one another and the core 36 is further withdrawn from the transformer 34 coil causing a change in voltage to be produced. Consequently, voltage changes are read from an auxiliary meter (not shown) as indicating changes in the size of the workpiece 100.

Referring to the drawings, the gauge 10 of the present invention has several critical dimensions that should be maintained throughout the operational temperature span of the gauge 10 in order to reduce inaccuracies in the gauge's voltage output. These critical dimensions include the distance between the pivot axes 20 and 21, indicated by dimensions A—A in FIG. 1, distance between tips 52 and 51 of fingers 14 and 15 and axes 20 and 21, indicated by dimension B—B in FIG. 2, and the position of the core 36 relative to the transformer 34, indicated by dimension C—C in FIG. 3.

Figure 4:
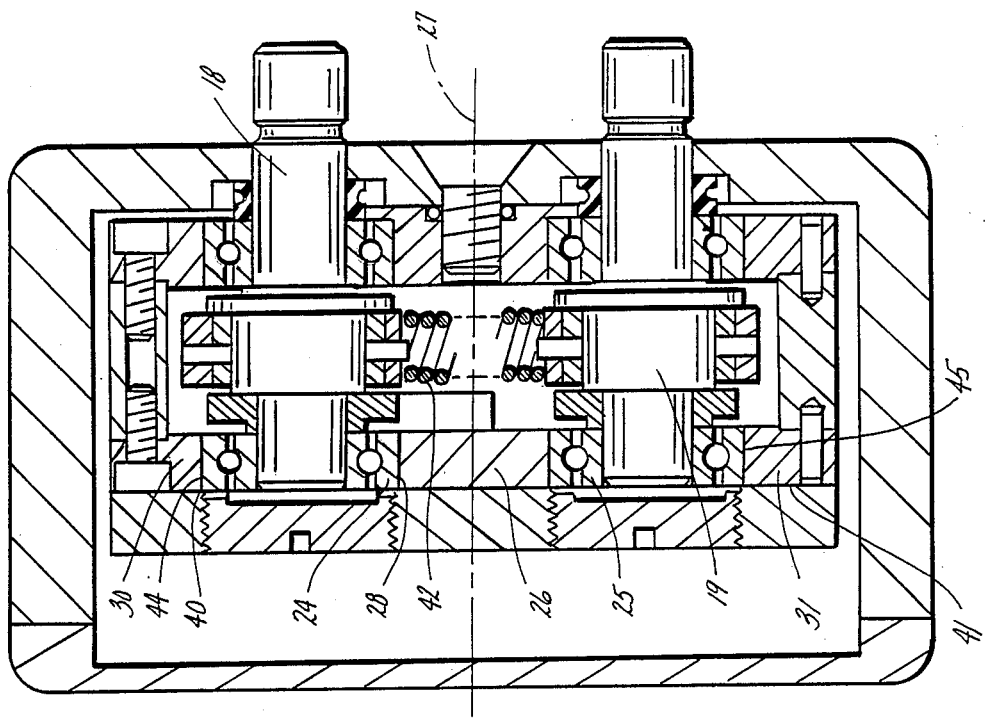
FIG. 4 is a sectional view of the gauge taken substantially from line 4—4 of FIG. 1.

The critical dimension A—A in FIG. 1 can be maintained by matching the thermal expansion of the components that support the pivots 18 and 19, as shown in FIG. 2, in one direction with thermal expansion of the pivot assemblies in the opposite direction. The pivot bearings 24 and 25 rest within the bearing cradle 26 in overbored bearing chambers 40 and 41. The chambers are overbored or slightly larger in diameter than the diameter of the pivot bearings 24 and 25. The oversizing results in a slight gap between the bearing cradle edges 28 and 29 and the bearings 24 and 25. As shown in FIG 4., a spring 42 biases the pivots 18 and 19 away from the bearing cradle center line 27. The center line 27 is substantially along the longitudinal line halfway between the pivot axes 20 and 21. This biasing of the spring 42 on the pivots 18 and 19 results in the pivots 18 and 19 contacting with the overbored chambers 40 and 41 at points 44 and 45.

The pivots 18 and 19 and their axes 20 and 21 move away from the bearing cradle center line 27 due to the thermal expansion of the bearing cradle 26, between its center line 27 and its outer edges 38 and 39, (indicated by dimension G—G), and the expansion of the end caps 30 and 31, between the bearing cradle outer edges 38 and 39 and the points 44 and 45 where the bearing contacts the end caps 30 and 31 (indicated by dimension D—D). The pivot axes 20 and 21 will be directed inward by the expansion of the bearings 24 and 25 along dimension E—E and the pivots 18 and 19 along their radii F—F. When the magnitude of expansion in each direction is equal, the pivot axes 20 and 21 will remain at a constant distance from the bearing cradle center line 27.

The dimensions of the bearing cradle 26 from the bearing cradle center line 27 to the bearing cradle edges 38 and 39, dimension G—G, the depth of the end cap depressions 80 and 81, dimension D—D, the diameter of the pivot bearings 24 and 25, dimension E—E, and the bearing radii, 82 and 83, dimension F—F, are all solved according to the following equation for the thermal coefficients of expansion of the different materials involved so that the pivot axes 20 and 21 remain at a constant distance from the bearing cradle center line 27. If the distance from the pivot axes 20 and 21 to the bearing cradle center line 27 changes during operation of the gauge 10, the arms 16 and 17 will be displaced resulting in movement of the linear voltage transformer core 36 relative to the transformer 34 results which, in turn, results in a change in the gauge voltage output. This change in voltage is read as change in the size of the workpiece 100 and is hence a source of gauge inaccuracy.

The calculation should be solved to have the expansion of those components that move the pivot axes 20 and 21 away from the bearing cradle center line 27 offset by the expansion of those components that cause the pivot axes 20 and 21 to move in a direction towards the bearing cradle center line 27. The equation to be solved therefore is:

$$(C_{BC})(D_{G-G}) + (C_{EC})(D_{D-D}) = (C_{PB})(D_{E-E}) + (C_P)(D_{F-F})$$

where
$C_{BC}$ = coefficient of expansion for the material of the bearing cradle
$D_{G-G}$ = the magnitude of dimension G—G
$C_{EC}$ = the coefficient of thermal expansion for the end cap
$D_{D-D}$ = the magnitude of dimension D—D
$C_{PB}$ = the coefficent of thermal expansion of the pivot bearing,
$D_{E-E}$ = the magnitude of dimension E—E
$C_P$ = the coefficient of thermal expansion for the pivot,
$D_{F-F}$ = the magnitude of dimension F—F The coefficient of thermal expansion for different materials are readily available from conventional metallurgy handbooks. All but one of the necessary distances may be preselected resulting in an equation that only has one variable to be solved for. This preselection may take the form of measuring the components in an existing gauge. All but one of those components are then inserted into the equation with proper coefficients of thermal expansion and the last part or variable is solved for.

The following example should not be construed to limit the present invention but is included for explanation purposes.

The bearing cradle 26 can be manufactured from Invar Steel. The end caps 30 and 31 can be manufactured from 303 Stainless Steel and both the pivot bearings 24 and 25, and the pivots 18 and 19 can be manufactured from 440C Stainless Steel. Using coefficients of thermal expansion that are widely published and accepted, the equation then becomes:

$$0.7 \times 10^{-6} \text{ IN/°F-IN } D_{G-G} + 9.6 \times 10^{-6} \text{ IN/°F-IN } D_{D-D} = 5.6 \times 10^{-6} \text{ IN/°F-IN } (D_{E-E} + D_{F-F})$$

For a desired application, let $D_{E-E} + D_{F-F} = 0.312$ inches and $D_{G-G} = 0.562$ inches Solving the equation for $D_{D-D}$ results in $D_{D-D} = 0.128$ inches Thus, by using the above dimensions and materials the expansion in both directions will be substantially equal. The use of different materials will require different dimensions of the components. Conversely, where the amount of room for the components is limited, the materials may be selected on the basis of their coefficient of expansion so as to effectively utilize the amount of space available.

Another source of false readings in the gauge voltage output due to the thermal expansion or contraction of the core 36 relative to the transformer 34 in the measuring mechanism 33 as illustrated in FIG. 3. Expansion of the core 36 causes it to be moved further into the transformer 34 with a resulting false reading to size of the workpiece.

The critical dimension C—C at the measuring mechanism 33 can also be isolated from thermal change. Turning to FIG. 3, arm 16 has a mounting block 46 secured thereto by fastener 70. A cylinder 48 is secured to the mounting block 46. The cylinder 48 has an aperture 49 for enabling passage of a pin 50 for securing the liner voltage distance transformer (hereinafter LVDT) core 36 in the cylinder 40. By offsetting the thermal expansion of the core 36 and the cylinder 48 in the direction of the transformer coil 34, by the thermal expansion of the mounting block 46, in an opposite direction, the core 36 can remain in the same location relative to the transformer 34 with the result being the minimization of the change in voltage output and hence the thermally induced change in the reading of the gauge 10. Again, by equating the expansion the core 36 towards the transformer 34 with the forces directing the core 36 away from the transformer 34 a state of little or no relative change relative to the transformer 34 due to temperature change may be achieved. The force directing the core 36 away from the transformer coil 34 is the thermal expansion of the mounting block 46, indicated by dimension I—I. The counteracting force is the expansion of the cylinder 48, indicated by dimension J—J, coupled with the expansion of the core 36, indicated by dimension K—K. The resulting equation similar to the above equation that balances those forces is:

$$(C_{MB})(D_{I\text{-}I}) = (C_C)(D_{J\text{-}J}) + (C_{CO})(D_{K\text{-}K})$$

With:

$C_{MB}$ = Coefficient of thermal expansion for the mounting block 46

$D_{I\text{-}I}$ = Distance I—I $C_C$ = Coefficient of thermal expansion for the cylinder 48

$D_{J\text{-}J}$ = Distance J—J $C_{CO}$ = Coefficient of thermal expansion for the core 36

$D_{K\text{-}K}$ = Distance K—K

The coefficients of thermal expansion can be found from a metallurgy handbook. The dimension K—K can be determined from the space constraints within the gauge. Dimensions J—J and I—I can be determined from existing parts within a gauge. Those dimensions are balanced along with the materials the parts are manufactured from to effectively satisfy the equation and hence reduce the movement of the core 36 relative to the coil 34.

It should also be recognized that other dimensions of the gauge that show appreciable effects through temperature changes can be held in substantially zero or minor dimensional changes using dissimilar materials designed to expand or contract in opposite directions.

An example of such a critical dimension B—B in FIG. 2. This dimension runs from the gauge finger tips 51 and 52 of the pivot axes 20 and 21, respectively. Change in this dimension cause radial movement of the gauge fingers 14 and 15 resulting in perceived changes in workpiece size. Turning to FIG. 5, a second embodiment of the gauge fingers is shown which achieves the desired minimization of change in this dimension. Only a single finger is shown and it is understood that the following explanation applies equally as well to the second finger. Note that like elements will be designated by the same reference numerals and the differences will be discussed.

In the assembly shown, the gauge finger 14 includes a gauge finger tip 52 at the free depending end and a gauge finger jaws 68 at the other. An insert or pivot shell 58 is positioned within the gauge finger jaw 68. The pivot shell 58 has a U-shaped cross-sectional configuration having a circular aperture at the base of the U. The legs of the U have grooves 71 and 73 on their exterior surface for engaging ridges 72 on the interior surface of the finger jaw 68. The pivot shell 58 is secured to the pivot 18 in the circular aperture bore for concurrent rotation therewith. The legs of the U-shaped cross-sectional pivot shell 58 are secured at one end to gauge finger 14 by a pin 60.

The material of pivot shell 58 is selected such that the thermal expansion over the shell 58 from the pin 60 to the pivot axis 20, dimension M—M is equal to the thermal expansion over the finger 14, from the pin 60 to the finger tip 52, dimension L—L.

Expansion over dimension M—M cause the end of pivot shell 58 to slide over the ridges 72 within gauge finger jaw 68. When subjected to increasing ambient temperature, dimension M—M is increased at a rate substantially equal to the coefficient of thermal expansion of the pivot shell 58 ($C_{PC}$). The change in ambient temperature will increase the length of the gauge finger 14, the dimension L—L at a rate equal to by the coefficient of thermal expansion of gauge finger 14.

An equation can be solved where:

$C_{GF}$ = the coefficient of thermal expansion for the gauge finger $D_{L\text{-}L}$ = the distance L—L $C_{PS}$ = the coefficient of thermal expansion for the pivot shell $D_{M\text{-}M}$ = the distance M—M.

By selecting the material for the pivot shell 58 and the gauge finger 14 and the respective dimension L—L and M—M so that the equation is satisfied, changes in the dimension B—B due to changes in the ambient temperature, are reduced. The equation corresponding to the above equation is:

$$(C_{PS})(D_{M\text{-}M}) = (C_{GF})(D_{L\text{-}L})$$

Other locations, such as mounting brackets, that show appreciable effects through temperature changes can be likewise designed to utilize dissimilar materials to allow for controlled expansion.

Preferred embodiments of the invention have been disclosed. The invention, however, is not to be limited to the specific structure shown, but rather is to be limited by the following claims.

We claim:

1. A temperature insensitive gauge comprising:
a frame;
first and second caliper assemblies movably mounted on said frame for engaging a work piece;
means coupled to said caliper assemblies for measuring the relative movement between said caliper assemblies to provide measurement information on the size of said work piece;
temperature compensating means for reducing the effects on measurement of thermally induced dimensional changes in the gauge, said temperature compensating means including;
insert means secured to said caliper assemblies;

gauge finger means secured to said insert means, said gauge finger means and said insert means oriented such that thermal expansion of said gauge finger means is offset by thermal expansion of said insert means thereby reducing the effects on measurement of thermally induced dimensional changes in the gauge.

2. The temperature insensitive gauge of claim 1 wherein:

said gauge finger means comprises at least one gauge finger having a finger tip for contacting said work piece, said gauge finger secured to said insert means;

said insert means further comprises at least one pivot shell having a pivot center line, said shell secured to one of said caliper assemblies, said pivot shell and said caliper assemblies oriented such that the thermal expansion of said gauge finger is offset by thermal expansion of said pivot shell so as to reduce thermally induced dimensional change between said pivot center line and said finger tip.

3. A temperature insensitive gauge comprising:

a frame;

first and second caliper assemblies movably mounted on said frame for engaging the surface of a workpiece;

means associated with said caliper assemblies for measuring the relative movement between said caliper assemblies providing measurement information on the size of said workpiece;

pivot means secured to said first and second caliper assemblies;

insert means secured to said caliper assemblies;

gauge finger means secured to said insert means said gauge finger means and said insert means oriented such that thermal expansion of said gauge finger means is offset by thermal expansion of said insert means to reduce the effects on measurement of thermally induced dimensional changes in the gauge;

bearing means secured to said frame and adapted to pivotally secure said first and second pivot means, said bearing means and said pivot means oriented such that thermal expansion of said bearing means is offset by thermal expansion of said pivot means so as to reduce the effects on measurement of thermally induced dimensional changes in the gauge;

mounting means having two attachment points, one of said points being secured to one of said caliper assemblies, the other said points being secured to said means for measuring, said mounting means and said means for measuring oriented such that thermal expansion of said means for measuring is compensated for by thermal expansion of said mounting means so as to reduce the effect on measurement of thermally induced dimensional changes in the gauge.

4. A temperature insensitive gauge comprising:

a frame;

first and second caliper assemblies movably mounted on said frame for engaging the surface of a workpiece;

means associated with said caliper assemblies for measuring the relative movement between said caliper assemblies to provide measurement of the size of said workpiece;

pivot means secured to said first and second caliper assemblies having pivot means axis;

pivot shells having a pivot center line, secured to said pivots so that said pivot center line and said pivot axis are colinear;

gauge finger means, having finger tip for contacting said workpiece, secured to said pivot shell, said gauge finger and said shell oriented such that thermal expansion of said gauge finger is offset by thermal expansion of said pivot shell so as to reduce thermally induced dimensional change between said pivot center line and said finger tip;

bearing cradle secured to said caliper assembly having a center line in substantial alignment with the longitudinal center line of said first and second caliper assemblies and a dished out edge;

end cap secured to said dished out edge of said bearing cradle so as to define an overbored bearing chamber between said center line region and said end cap;

bias means for biasing said pivot away from said center line of said bearing cradle and into contact with said end cap, said pivot and said bearing cradle oriented such that thermal expansion of said pivots is offset by thermal expansion of said bearing cradle and end cap so as to reduce thermally induced changed in the dimension between said pivot axis and said center line of said bearing cradle;

a linear voltage distance transformer coil secured to said first caliper assembly;

a linear voltage distance transformer core disposed within said coil so as to produce an electric signal proportional to the relative position of said core relative to said coil;

mounting means secured to said core and secured to said second caliper assembly said mounting means and said core oriented such that thermally induced movement of said core relative to said coil is offset by thermal expansion of said mounting means so as to reduce thermally induced changed in the position of said core relative to said coil.

5. A temperature insensitive gauge comprising:

a frame;

first and second caliper assemblies movably mounted on said frame for engaging a workpiece;

pivot means secured to said first and second caliper assemblies for allowing rotatably movement of said first and second caliper assemblies about first and second axes;

a bearing cradle secured to the gauge having a center line in substantial alignment with the longitudinal center line of said first and second caliper assemblies and having an edge forming a dished out edge enabling the seating of said pivots;

an end cap secured to said dished out edge of said bearing cradle so as to define an overbored bearing chamber between said center line region and said end cap said overbored bearing chamber surrounding said pivot means;

bias means for biasing said pivot means away from said center line of said bearing cradle and into contact with said end cap;

said bearing cradle and said pivot means oriented such that expansion of said bearing cradle and said end cap away from said center line is offset by expansion of said pivot means towards said center line so as to reduce thermally induced dimensional changes between said center line and said pivot means axis;

6. A temperature insensitive gauge of claim 3 further comprising;
  linear voltage distance transformer coil secured to said first caliper assembly;
  linear voltage distance transformer core disposed within said coil so as to produce an electrical signal proportional to the position of said core relative to said coil;
  mounting means secured to said core and secured to said second caliper assembly said mounting means and said core oriented such that thermally induced movement of said core relative to said coil is offset by thermal expansion of said mounting means so as to reduce thermally induced relative movement of said coil relative to said core.

7. A temperature insensitive gauge of claim 6 further comprising:
  pivot shells having a pivot center line secured to said pivot menas for concurrent rotative movement with said pivot means;
  at lease one gauge finger having a finger tip for contacting said workpiece, secured to at least one of said pivot shells said gauge finger and said pivot shell oriented so that thermal expansion of said gauge finger is offset by thermal expansion of said pivot shell so as to reduce thermally induced change in the dimension between said pivot axis and said finger tip.

8. A temperature insensitive gauge comprising:
  a frame;
  first and second caliper assemblies movably mounted on said frame for engaging a work piece;
  means coupled to said caliper assemblies for measuring the relative movement between said caliper assemblies to provide measurement information on the size of said work piece;
  temperature compensating means for reducing the effects on measurement of thermally induced dimensional changes in the gauge said temperature compensating means including; first and second pivot means secured to said first and second caliper assemblies, and bearing means secured to said frame and adapted to pivotally secure said first and second pivot means, said bearing means and said pivot means oriented such that thermal expansion of said bearing means is offset by thermal expansion of said pivot means so as to reduce the effects on measurement of thermally induced dimensional changes in the gauge.

9. The temperature insensitive gauge of claim 8 wherein said bearing means further comprises:
  a bearing cradle secured to said caliper assemblies, said cradle having a center line in substantial alignment with the longitudinal center line of said first and second caliper assemblies, and wherein a dished out edge is formed in said cradle enabling the seating of said pivots;
  an end cap secured to said dished out edge of said bearing cradle so as to define an overbored bearing chamber between said center line region and said end cap;
  bias means for biasing said pivot means away from said center line of said bearing cradle and into contact with said end cap;
  said first and second pivot means further comprising caliper arm pivots having a pivot center line pivotally disposed within said overbored bearing chamber, said caliper arm pivots and said bearing cradle and end cap oriented such that the thermal expansion of said caliper arm pivots is offset by the thermal expansion of said bearing cradle and end cap to reduce thermally induced dimensional changes in the dimension between said pivot center line and said center line of said bearing cradle.

10. A temperature insensitive gauge comprising:
  a frame;
  first and second caliper assemblies movably mounted on said frame for engaging a work piece;
  means coupled to said caliper assemblies for measuring the relative movement between said caliper assemblies to provide measurement information on the size of said work piece;
  temperature compensating means for reducing the effects on measurement of thermally induced dimensional changes in the gauge, said temperature compensating means including, mounting means having two attachment points, one of which being secured to one of said caliper assemblies, the other said attachment point being secured to said means for measuring, said means for measuring and said mounting means oriented such that thermal expansion of said means for measuring is compensated for by thermal expansion of said mounting means so as to reduce the effects on measurement of thermally induced dimensional changes in the gauge.

11. The temperature insenstive gauge of claim 10 wherein said means for measuring includes:
  a linear voltage distance transformer coil secured to said first caliper assembly;
  a linear voltage distance transformer core disposed within said coil so as to produce an electric signal proportional to the position of said core relative to said coil;
  mounting means secured to said core and secured to said second caliper assembly said core and said mounting means oriented such that thermally induced movement of said core relative to said coil is offset by thermal expansion of said mounting means so as to reduce the effects on measurement of thermally induced dimensional changes in the gauge.

* * * * *